United States Patent
Dudar et al.

(10) Patent No.: US 10,354,459 B2
(45) Date of Patent: Jul. 16, 2019

(54) HYDROCARBON-EMISSIONS MONITORING

(71) Applicant: Ford Global Technologies, LLC, Dearborn, MI (US)

(72) Inventors: Aed M. Dudar, Canton, MI (US); Douglas Raymond Martin, Canton, MI (US); Kenneth James Miller, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 356 days.

(21) Appl. No.: 15/286,806

(22) Filed: Oct. 6, 2016

(65) Prior Publication Data

US 2018/0101997 A1    Apr. 12, 2018

(51) Int. Cl.
| | | |
|---|---|---|
| *G07C 5/00* | (2006.01) | |
| *F02D 41/14* | (2006.01) | |
| *F02D 41/00* | (2006.01) | |
| *G05D 1/02* | (2006.01) | |
| *B60H 1/00* | (2006.01) | |

(Continued)

(52) U.S. Cl.
CPC ............. *G07C 5/008* (2013.01); *B60H 1/008* (2013.01); *B60H 1/00821* (2013.01); *F02D 41/004* (2013.01); *F02D 41/0037* (2013.01); *F02D 41/144* (2013.01); *F02D 41/1459* (2013.01); *F02D 41/22* (2013.01); *F02M 25/089* (2013.01); *G05D 1/021* (2013.01); *F02D 2041/228* (2013.01); *F02D 2200/04* (2013.01); *F02D 2200/70* (2013.01);
(Continued)

(58) Field of Classification Search
CPC ..... G07C 5/008; F02D 41/22; F02D 41/1459; F02D 41/0037; F02D 41/144; F02D 41/004; F02D 2041/228; F02D 2200/701; F02D 2200/70; F02D 2200/04; G05D 1/021; G05D 2201/0213; B60H 1/00821; B60H 1/008
See application file for complete search history.

(56) References Cited

U.S. PATENT DOCUMENTS

| | | |
|---|---|---|
| 5,252,828 A | 10/1993 | Kert et al. |
| 5,719,396 A | 2/1998 | Jack et al. |

(Continued)

FOREIGN PATENT DOCUMENTS

| | | |
|---|---|---|
| CN | 101275882 A | 10/2008 |
| CN | 202832728 U | 3/2013 |

(Continued)

OTHER PUBLICATIONS

Search Report from United Kingdom Intellectual Property Office dated Mar. 7, 2018 regarding GB Application No. 1714502.0 (4 pages).

*Primary Examiner* — Anne M Antonucci
(74) *Attorney, Agent, or Firm* — Frank A. MacKenzie; Bejin Bieneman PLC (57) ABSTRACT

A first vehicle includes a hydrocarbon sensor and a controller in communication with the hydrocarbon sensor. The controller is programmed to receive data from the hydrocarbon sensor indicating hydrocarbon emissions and determine that the hydrocarbon emissions originated in a second vehicle and are exceed a predetermined threshold. The controller may further be programmed to transmit a message reporting the hydrocarbon emission to a remote server.

18 Claims, 5 Drawing Sheets

(51) Int. Cl.
*F02M 25/08* (2006.01)
*F02D 41/22* (2006.01)

(52) U.S. Cl.
CPC ............... *F02D 2200/701* (2013.01); *G05D 2201/0213* (2013.01); *Y02T 10/40* (2013.01)

(56) References Cited

U.S. PATENT DOCUMENTS

| | | | |
|---|---|---|---|
| 6,081,758 A | | 6/2000 | Parvulescu |
| 6,546,955 B1 | * | 4/2003 | Burke .................. F02M 25/089 |
| | | | 123/516 |
| 7,278,657 B1 | | 10/2007 | McCurdy |
| 7,803,039 B2 | * | 9/2010 | Inoue .................... B60H 1/008 |
| | | | 165/249 |
| 8,649,941 B1 | | 2/2014 | Tsuda et al. |
| 2004/0144186 A1 | | 7/2004 | Ketley |
| 2006/0027412 A1 | | 2/2006 | Geborek |
| 2008/0236141 A1 | | 10/2008 | Peng et al. |

FOREIGN PATENT DOCUMENTS

| | | |
|---|---|---|
| DE | 102004021648 A1 | 12/2005 |
| FR | 2909044 A1 | 5/2008 |
| GB | 2547771 A | 8/2017 |
| JP | 2007232566 A | 9/2007 |
| KR | 20030092281 A | 12/2003 |

* cited by examiner

HYDROCARBON-EMISSIONS MONITORING

BACKGROUND

On-board diagnostics is a system in a vehicle for monitoring issues related to emissions and possibly other vehicle issues. Various sensors are connected to the on-board diagnostics to monitor components having an effect on emissions. If one of the sensors detects an issue, then the on-board diagnostics illuminates a "check engine" light. The on-board diagnostics includes a connector to which a technician can plug in a tool to read a diagnostic trouble code (DTC). The diagnostic trouble code corresponds to the issue detected by one or more of the sensors. Vehicles manufactured after 1996 and sold in the United States are required to have on-board diagnostics conforming to the OBD-II standard.

DETAILED DESCRIPTION

With reference to the Figures, wherein like numerals indicate like parts throughout the several views, a first vehicle 30 includes a hydrocarbon sensor 34 and a controller 36 in communication with the hydrocarbon sensor 34. The controller 36 is programmed to receive data from the hydrocarbon sensor 34 indicating hydrocarbon emissions, determine that the hydrocarbon emissions originated in a second vehicle 32 and exceed a predetermined threshold. (The adjectives "first," "second," and "third" are used throughout this document for convenience as identifiers and are not intended to signify importance or order.)

The first vehicle 30 provides enhanced monitoring of hydrocarbon emissions. For example, the first vehicle 30 may be able to detect elevated emissions from one or more second vehicles 32 that may have missing, disabled, or outdated on-board diagnostics; second vehicles 32 whose owners have not responded to notifications from their on-board diagnostics; and/or hybrid second vehicles 32 whose on-board diagnostics are not operating because the vehicles are running electrically. The first vehicle 30 can thus assist to reduce an overall quantity of hydrocarbon emissions.

Figure 1:
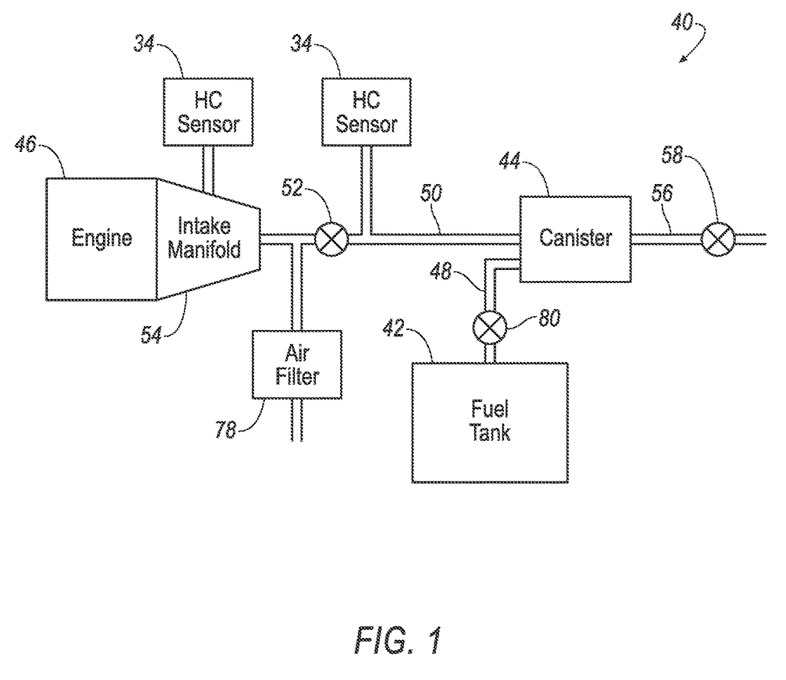
FIG. 1 is a diagram of a fuel system of an example first vehicle.

With reference to FIG. 1, the first vehicle 30 may include a fuel system 40. The fuel system 40 includes components through which fuel passes. The fuel system 40 includes a fuel tank 42, a canister 44, and an engine 46. The fuel tank 42 is in communication with the canister 44 via a load line 48 and a vapor blocking valve 80. The canister 44 is in communication with the engine 46 via a canister purge line 50 connected to a canister purge valve 52, which is connected to the engine 46 via an intake manifold 54.

The fuel tank 42 is disposed in and stores fuel for the first vehicle 30. The fuel tank 42 may receive fuel via a filler neck from an inlet coverable by a gas cap (not shown). The fuel tank 42 contains a fuel pump (not shown), which draws fuel from the fuel tank 42 to ultimately deliver the fuel to the engine 46.

The canister 44 stores evaporated fuel pumped from the fuel tank 42 through the load line 48 and vapor blocking valve 80. The canister 44 may, for example, contain charcoal, or any other substance suitable for storing evaporated fuel. The canister 44 is connected through a vent line 56 and a canister vent valve 58 to the external environment. The canister vent valve 58 may draw air from the environment to the canister 44.

The canister 44 is connected through the canister purge line 50, the canister purge valve 52, and the intake manifold 54 to the engine 46. The canister purge line 50 is in fluid communication with the canister purge valve 52 and the canister 44. "Fluid communication" means that a path exists for fluid, i.e., liquid and/or gas, to flow between the canister purge valve 52 and the canister 44. The canister 44 may discharge air and evaporated fuel through the canister purge valve 52 to the intake manifold 54 to be used by the engine 46.

The intake manifold 54 draws air through an air filter 78 from the external environment and an air-fuel mixture through the canister purge valve 52 from the canister 44. The intake manifold 54 distributes an air-fuel mixture to cylinders (not shown) in the engine 46.

The engine 46 may be an internal-combustion engine including the cylinders that translate a chemical reaction of the air-fuel mixture into mechanical energy. Burning the air-fuel mixture drives cylinder heads within the cylinders, which rotates a crankshaft mechanically connected to wheels, driving the first vehicle 30 (not shown).

The first vehicle 30 includes the hydrocarbon sensor 34. The hydrocarbon sensor 34 detects a concentration of hydrocarbon molecules in a sample of gas and produces a signal based on the concentration. The hydrocarbon sensor 34 may be any type of detector for hydrocarbons, for example, known detectors include electrochemical, infrared point, infrared imaging, semiconductor, ultrasonic, or holographic.

The hydrocarbon sensor 34 may be located anywhere on the first vehicle 30 from which the hydrocarbon sensor 34 can detect hydrocarbon emissions in the external environment. For example, the hydrocarbon sensor 34 may be mounted to the intake manifold 54. For another example, the hydrocarbon sensor 34 may be connected to the canister purge line 50 near the canister purge valve 52.

Figure 2:
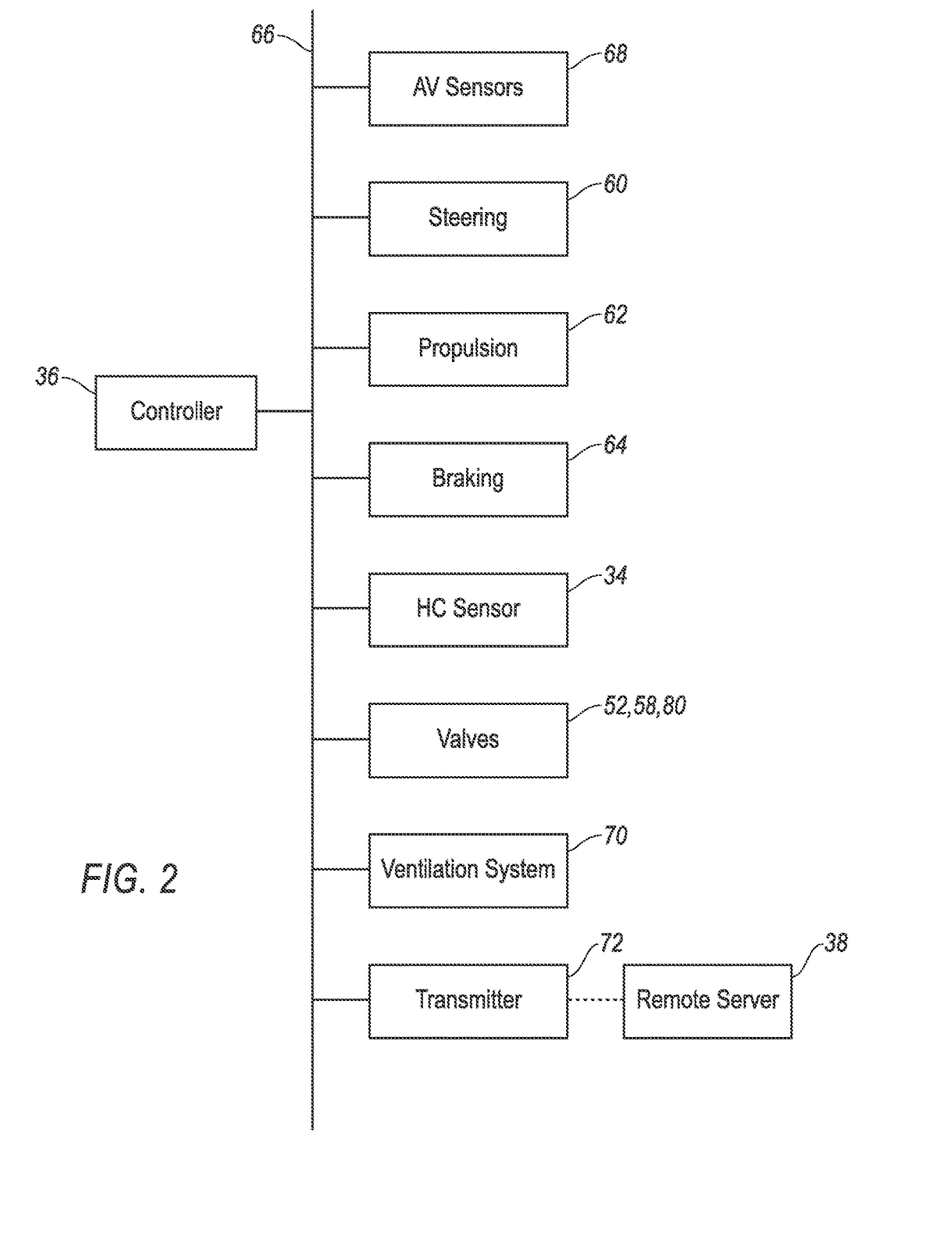
FIG. 2 is a block diagram of a control system of the first vehicle.

With reference to FIG. 2, the first vehicle 30 may be an autonomous vehicle. The controller 36, sometimes referred to as the "virtual driver," may be capable of operating the vehicle independently of the intervention of a human driver, to a greater or a lesser degree. The controller 36 may be programmed to operate steering 60, propulsion 62, braking 64 and/or other vehicle systems. For purposes of this disclosure, an autonomous mode is defined as one in which each of the steering 60, propulsion 62, and braking 64 are controlled by the controller 36. In a semiautonomous mode, the controller 36 controls one or two of the steering 60, propulsion 62, and braking 64. In a nonautonomous mode, the steering 60, propulsion 62, and braking 64 are controlled by a human operator.

The controller 36 is included in the vehicle-control system for carrying out various operations, including as described herein. The controller 36 is a computing device that generally includes a processor and a memory, the memory including one or more forms of computer-readable media, and storing instructions executable by the processor for performing various operations, including as disclosed herein. The memory of the controller 36 further generally stores remote data received via various communications mechanisms; e.g., the controller 36 is generally configured for communications on a controller area network (CAN) bus or the like, and/or for using other wired or wireless protocols, e.g., Bluetooth, etc. The controller 36 may also have a connection to an onboard diagnostics connector (OBD-II). Via a communications network 66 that may include OBD-II as well as Ethernet, WiFi, the CAN bus, Local Interconnect Network (LIN), and/or other wired or wireless mechanisms, the controller 36 may transmit messages to various devices in the vehicle and/or receive messages from the various devices, e.g., controllers, actuators, sensors, etc., e.g., controllers and sensors as discussed herein. For example, the controller 36 may be in communication with the hydrocarbon sensor 34. Although one controller 36 is shown in FIG. 2 for ease of illustration, it is to be understood that the controller 36 could include, and various operations described herein could be carried out by, one or more computing devices.

The controller 36 may transmit and receive signals through the communications network 66 such as a controller area network (CAN) bus, Ethernet, Local Interconnect Network (LIN), and/or by any other wired or wireless communications network. The communications network 66 may connect the controller 36 to vehicle systems, including, for example, the steering 60, propulsion 62, and braking 64, as well as operating sensors 68, e.g., for autonomous or semi-autonomous operation and/or for monitoring vehicle operations, e.g., for lane-keeping alerts. The communications network 66 may also connect the controller 36 to other vehicle systems, such as the hydrocarbon sensor 34, the valves 52, 58, 80, a ventilation system 70, and a transmitter 72.

The first vehicle 30 may include the operating sensors 68. The operating sensors 68 may detect internal states of the vehicle, for example, wheel speed, wheel orientation, and engine and transmission variables. The operating sensors 68 may detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The operating sensors 68 may detect the external world, for example, radar sensors, scanning laser range finders, light detection and ranging (LIDAR) devices, and image processing sensors such as cameras. The operating sensors 68 may include communications devices, for example, vehicle-to-infrastructure (V2I) or vehicle-to-vehicle (V2V) devices.

The steering 60 is typically a known vehicle steering subsystem and controls the turning of the wheels. The steering 60 is in communication with and receives input from a steering wheel and the controller 36. The steering 60 may be, e.g., a rack-and-pinion system with electric power-assisted steering, a steer-by-wire system, such as are known.

The propulsion 62 of the vehicle generates energy and translates the energy into motion of the vehicle. The propulsion 62 may be a known vehicle propulsion subsystem, for example, a conventional powertrain including the engine 46 coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. If the propulsion 62 is an electric powertrain, the first vehicle 30 would not include the fuel system 40. The propulsion 62 is in communication with and receives input from the controller 36 and from a human driver. The human driver may control the propulsion 62 via, e.g., an accelerator pedal and/or a gear-shift lever.

The braking 64 is typically a known vehicle braking subsystem and resists the motion of the vehicle to thereby slow and/or stop the vehicle. The braking 64 may be friction brakes such as disc brakes, drum brakes, band brakes, and so on; regenerative brakes; any other suitable type of brakes; or a combination. The braking 64 is in communication with and receives input from the controller 36 and a human driver. The human driver may control the braking 64 via, e.g., a brake pedal.

The transmitter 72 may be connected to the communications network 66. The transmitter 72 may be adapted to transmit signals wirelessly through any suitable wireless communication protocol, such as Bluetooth, WiFi, 802.11a/b/g, radio, etc. The transmitter 72 may be adapted to communicate with the remote server 38, that is, a server distinct and spaced from the vehicle. The remote server 38 is located outside the vehicle. For example, the remote server 38 may be associated with other vehicles (e.g., V2V communications), infrastructure components (e.g., V2I communications), emergency responders, mobile devices associated with the owner of the vehicle, etc.

The ventilation system 70 may be in communication with the controller 36. The ventilation system 70 may be included in a climate-control system and may include a compressor, a condenser, a receiver-dryer, a thermal-expansion valve, an evaporator, blowers, fans, ducts, vents, vanes, temperature sensors, and other components that are known for supplying or impeding air flow to vehicle interiors.

Figure 3:
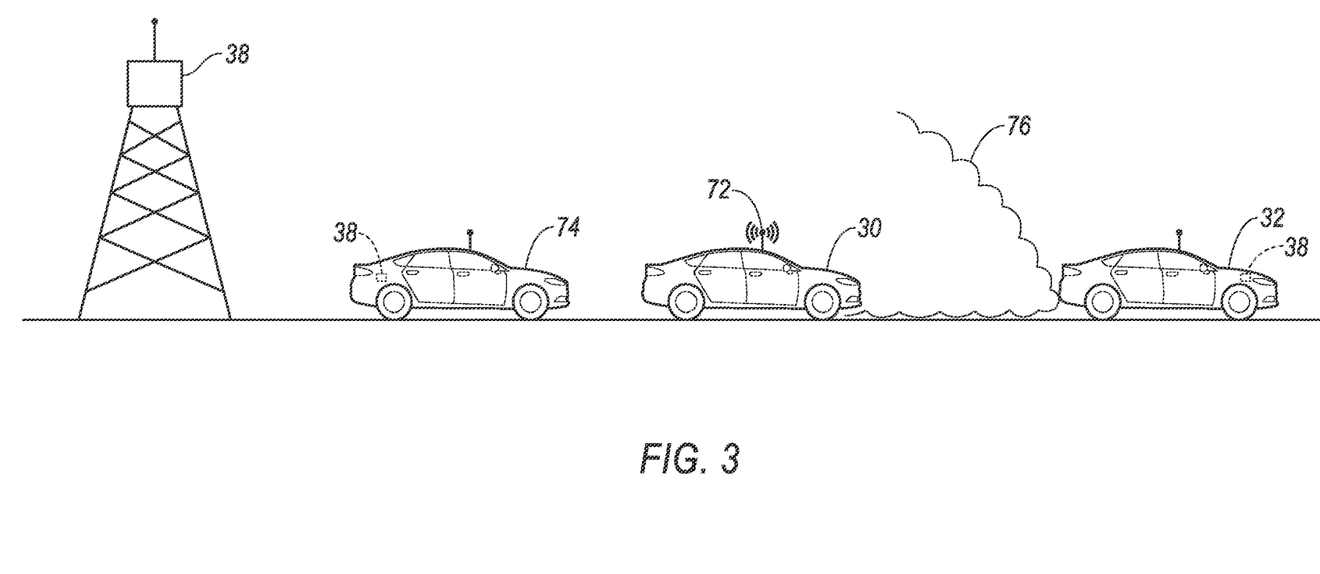
FIG. 3 is a diagram of a driving environment of the first vehicle, including a second vehicle.
Figure 4:
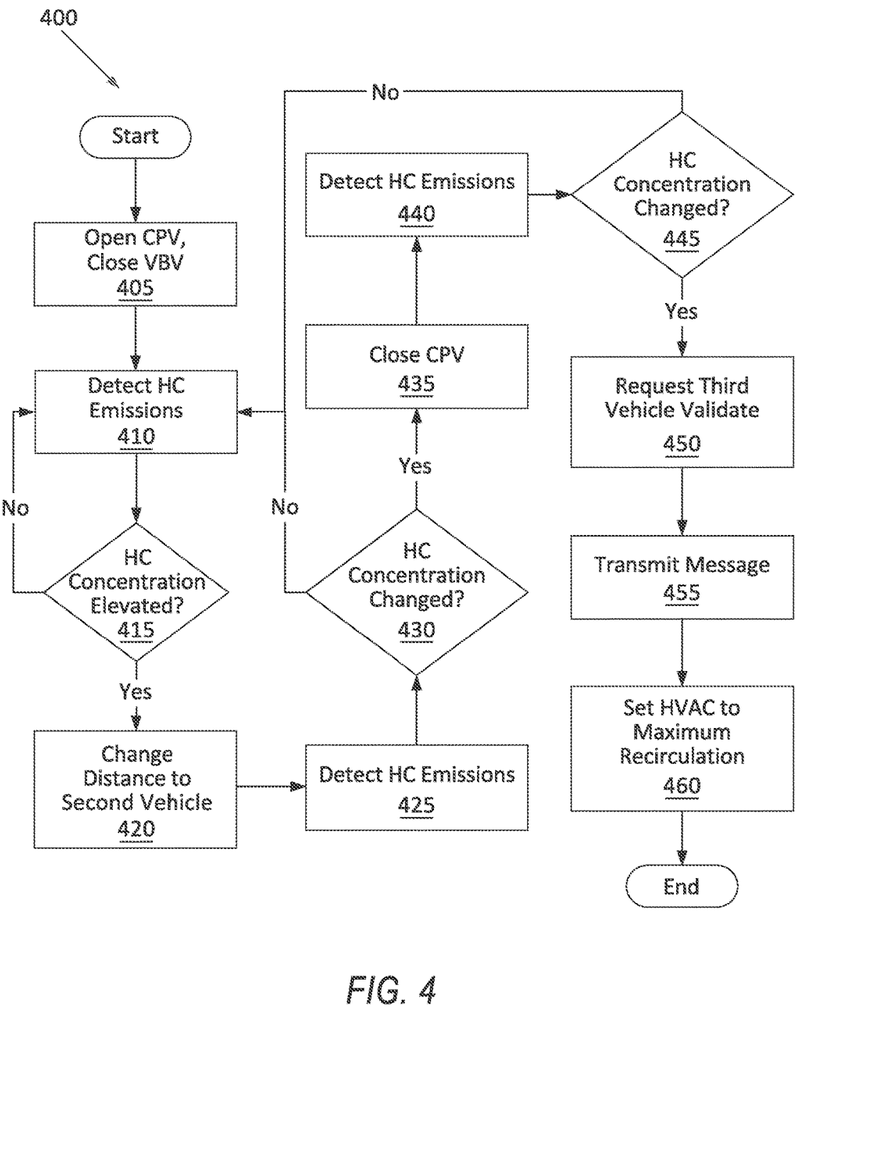
FIG. 4 is a process flow diagram of an example process for detecting hydrocarbon emissions of the second vehicle.

FIG. 4 is a process flow diagram illustrating an exemplary process 400 for detecting hydrocarbon emissions of the second vehicle 32 in the first vehicle 30. The process 400 may be used when the hydrocarbon sensor 34 is located on the canister purge line 50 between the canister 44 and the canister purge valve 52. When the process 400 begins, as shown in FIG. 3, the second vehicle 32 is a leading vehicle and the first vehicle 30 is a trailing vehicle. Thus, the first vehicle 30 is in an exhaust plume 76 of the second vehicle 32, which may extend 100 feet behind the second vehicle 32.

With reference to FIG. 4, the process 400 begins in a block 405, in which the controller 36 causes the canister purge valve (CPV) 52 to open and the vapor blocking valve (VBV) 80 to close by sending a message to a CPV actuator (not shown) and a VBV actuator (not shown), respectively, via the communications network 66.

Next, in a block 410, the controller 36 detects hydrocarbon emissions in the first vehicle 30. More specifically, the controller 36 receives data from the hydrocarbon sensor 34 through the communications network 66 indicating hydrocarbon emissions.

Next, in a decision block 415, the controller 36 determines whether the hydrocarbon emissions are elevated. For example, the controller 36 may determine whether the concentration of hydrocarbon emissions is above a threshold. The threshold may be based on experimentation, simulation, and/or regulations that correspond to a concentration of hydrocarbons above an expected or desired concentration. The threshold may be constant, for example, 1.5 or 2.5 parts per million (ppm). Alternatively, the threshold may be situationally dependent, for example, a change relative to a running average, a value equal to twice a one-minute running average or a value equal to 1000 ppm above the one-minute running average. For another example, the controller 36 could be programmed to use a threshold that is higher in urban areas with a greater density of motor vehicles than in rural areas with a lower density of motor vehicles, such as by downloading a value based on a local regulation or standard upon entering a municipality. If the controller 36 determines that the hydrocarbon emissions are not elevated, the process 400 returns to the block 410 to continue detecting hydrocarbon emissions.

If the controller 36 determines that the hydrocarbon emissions are elevated, i.e., over the applicable threshold, then the controller 36 determines whether the hydrocarbon emissions originated in the second vehicle 32, e.g., by executing some or all of the blocks 420-450 as described below.

In the block 420, which follows the decision block 415, the controller 36 determines that a change in a position of the first vehicle 30 relative to the second vehicle 32 has occurred, e.g., that geo-coordinates have changed by more than a predetermined threshold and/or in a direction relative to the second vehicle 32, determined according to an operating sensor 68 such as a GPS sensor or a LIDAR or vision system. If the first vehicle 30 is autonomous or semiautonomous, the controller 36 may cause the first vehicle 30 to change position relative to the second vehicle 32. Alternatively, the controller 36 may wait until the first vehicle 30 has changed position relative to the second vehicle 32. The change in position may be, for example, an increase in trailing distance between the first vehicle 30 and the second vehicle 32, a lateral change in position such as a lane change by the first vehicle 30 or the second vehicle 32, a change in order between the first vehicle 30 and the second vehicle 32 such as the first vehicle 30 passing the second vehicle 32, or any other change in position by the first vehicle 30 relative to the exhaust plume 76 of the second vehicle 32.

Next, in a block 425, the controller 36 detects hydrocarbon emissions in the first vehicle 30 after the change in position. More specifically, after the change in position the controller 36 receives data, from the hydrocarbon sensor 34 through the communications network 66, indicating hydrocarbon emissions.

Next, in a decision block 430, the controller 36 determines whether the hydrocarbon emissions changed compared with the hydrocarbon emissions from the block 410. The controller 36 may determine whether the concentration of hydrocarbon emissions from the block 425 is above or below the concentration of hydrocarbon emissions from the block 410. If the controller 36 determines that the hydrocarbon emissions did not change compared with the hydrocarbon emissions from the block 410, then the process 400 returns to the block 410.

If the controller 36 determines that the hydrocarbon emissions did change compared with the hydrocarbon emissions from the block 410, next, in a block 435, the controller 36 causes the canister purge valve (CPV) 52 to close by sending a message to the CPV actuator (not shown) via the communications network 66.

Next, in a block 440, the controller 36 detects hydrocarbon emissions in the first vehicle 30 after the canister purge valve 52 closes. More specifically, the controller 36 receives data from the hydrocarbon sensor 34 through the communications network 66 indicating hydrocarbon emissions after the canister purge valve 52 closes.

Next, in a decision block 445, controller 36 determines whether the hydrocarbon emissions changed compared with the hydrocarbon emissions from the block 410, as described above with respect to the decision block 430. If the controller 36 determines that the hydrocarbon emissions did not change compared with the hydrocarbon emissions from the block 410, then the process 400 returns to the block 410.

If the controller 36 determines that the hydrocarbon emissions did change compared with the hydrocarbon emissions from the block 410, next, in a block 450, the controller 36 transmits a message to a remote server 38 in a third vehicle 74 requesting that the third vehicle 74 validate the hydrocarbon emissions, as shown in FIG. 3. Specifically, the controller 36 may cause the transmitter 72 to transmit the message. The message may include, for example, a requested action, identifying information of the second vehicle 32, a diagnostic trouble code, the concentrations of hydrocarbon emissions measured by the hydrocarbon sensor 34, a timestamp, and/or other relevant information.

Next, in a block 455, the controller 36 transmits a message reporting the hydrocarbon emissions to a remote server 38. As shown in FIG. 3, the remote server 38 may be included in the second vehicle 32. The message to the remote server 38 in the second vehicle 32 may include a request that the second vehicle 32 run on-board diagnostics, a diagnostic trouble code, the concentrations of hydrocarbon emissions measured by the hydrocarbon sensor 34, a timestamp, and/or other relevant information. The second vehicle 32 may respond to the message by performing on-board diagnostics, illuminating a "check engine" light, and/or setting a diagnostic trouble code. Alternatively, the remote server 38 may be separate from the second vehicle 32. For example, the remote server 38 may be connected to a local, state, or federal monitoring agency. The message to the remote server 38 of the monitoring agency may include identifying information of the second vehicle 32, a diagnostic trouble code, the concentrations of hydrocarbon emissions measured by the hydrocarbon sensor 34, a timestamp, and/or other relevant information.

Next, in a block 460, the controller 36 causes the ventilation system 70 to increase a recirculation setting based on the hydrocarbon emissions being elevated. Increasing the recirculation setting increases the proportion of airflow through the ventilation system 70 drawn from a passenger cabin (not shown) of the vehicle rather than from the external environment. For example, the controller 36 may cause the ventilation system 70 to set recirculation at a maximum setting.

Figure 5:
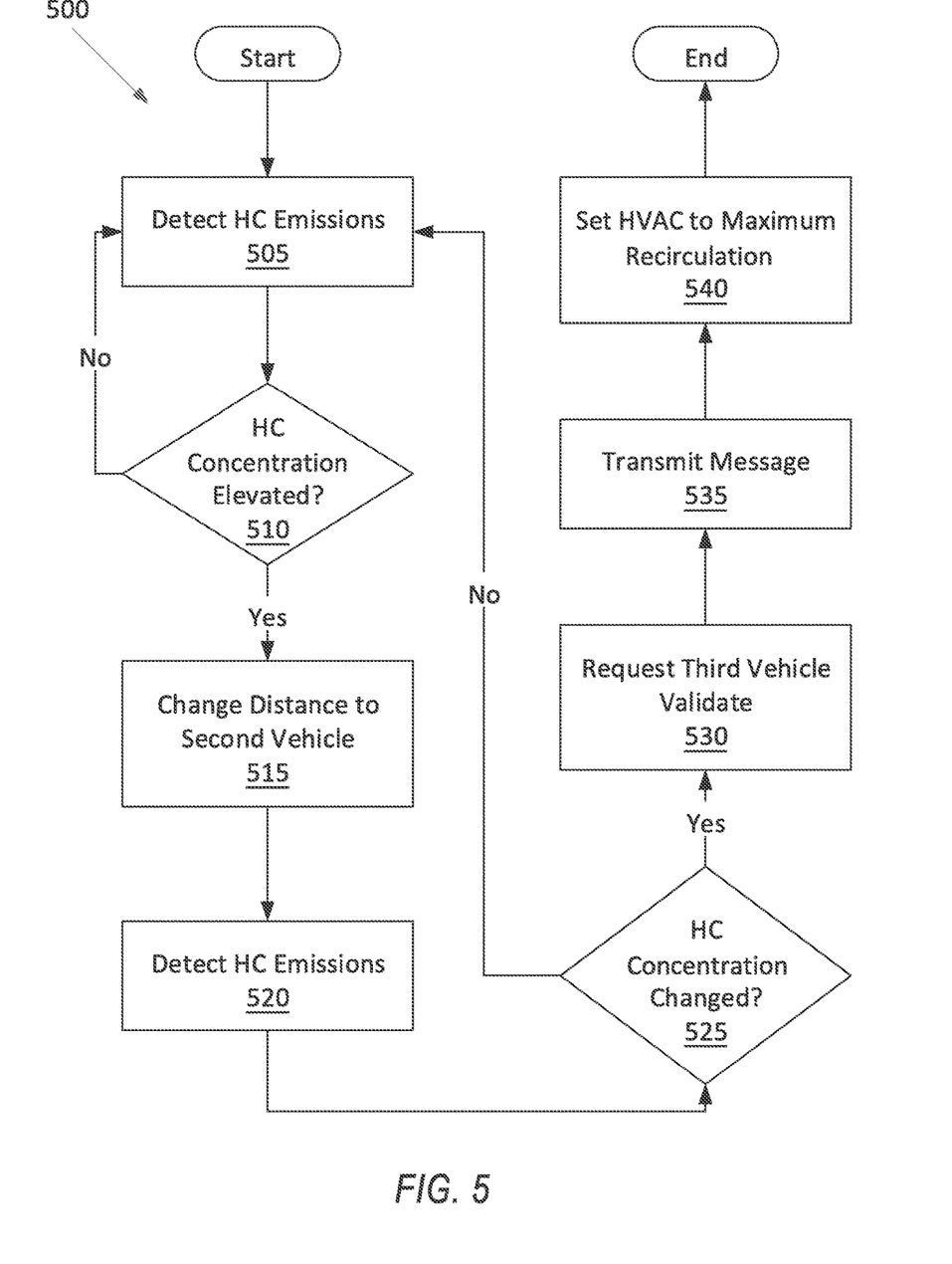
FIG. 5 is a process flow diagram of another example process for detecting hydrocarbon emissions of the second vehicle.

FIG. 5 is a process flow diagram illustrating an exemplary process 500 for detecting hydrocarbon emissions of the second vehicle 32 in the first vehicle 30. The process 500 may be used when the hydrocarbon sensor 34 is located on the intake manifold 54 or elsewhere on the first vehicle 30. When the process 500 begins, as shown in FIG. 3, the second vehicle 32 is a leading vehicle and the first vehicle 30 is a trailing vehicle. Thus, the first vehicle 30 is in the exhaust plume 76 of the second vehicle 32.

With reference to FIG. 5, the process 500 begins in a block 505, in which the controller 36 detects hydrocarbon emissions in the first vehicle 30, as described above with respect to the block 410.

Next, in a decision block 510, the controller 36 determines whether the hydrocarbon emissions are elevated, as described above with respect to the block 415. If the controller 36 determines that the hydrocarbon emissions are not elevated, the process 500 returns to the block 505 to continue detecting hydrocarbon emissions.

If the controller 36 determines that the hydrocarbon emissions are elevated, i.e., over the applicable threshold, then the controller 36 determines whether the hydrocarbon emissions originated in the second vehicle 32, e.g., by executing some or all of the blocks 515-530 as described below.

In the block 515, which follows the decision block 510, the controller 36 determines that a change in a position of the first vehicle 30 relative to the second vehicle 32 has occurred, as described above with respect to the block 420.

Next, in a block 520, the controller 36 detects hydrocarbon emissions in the first vehicle 30 after the change in position, as described above with respect to the block 425.

Next, in a decision block 525, the controller 36 determines whether the hydrocarbon emissions changed compared with the hydrocarbon emissions from the block 505, as described above with respect to the block 430. If the controller 36 determines that the hydrocarbon emissions did not change compared with the hydrocarbon emissions from the block 505, then the process 500 returns to the block 505.

If the controller 36 determines that the hydrocarbon emissions did change compared with the hydrocarbon emissions from the block 505, next, in a block 530, the controller 36 transmits a message to the remote server 38 in the third vehicle 74 requesting that the third vehicle 74 validate the hydrocarbon emissions, as shown in FIG. 3 and described above with respect to the block 450.

Next, in a block 535, the controller 36 transmits a message reporting the hydrocarbon emissions to a remote server 38, as described above with respect to the block 455.

Next, in a block 540, the controller 36 causes the ventilation system 70 to increase a recirculation setting based on the hydrocarbon emissions being elevated, as described above with respect to the block 460.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A controller comprising a processor and a memory storing instructions executable by the processor to:
    detect hydrocarbon emissions by a first vehicle before a change in position of the first vehicle relative to a second vehicle;
    detect hydrocarbon emissions by the first vehicle after the change in position of the first vehicle relative to the second vehicle;
    determine that the hydrocarbon emissions originated in the second vehicle by determining that the detected hydrocarbon emissions changed from before to after the change in the position of the first vehicle relative to the second vehicle; and
    determine that the detected hydrocarbon emissions from the second vehicle exceed a predetermined threshold.

2. The controller of claim 1, wherein the instructions further include to cause the first vehicle to change position relative to the second vehicle.

3. The controller of claim 1, wherein the instructions to determine that the hydrocarbon emissions originated in the second vehicle includes instructions to cause a canister purge valve to close and to detect hydrocarbon emissions after the canister purge valve closes.

4. The controller of claim 1, wherein the instructions further include to transmit a message reporting the hydrocarbon emissions to a remote server included in the second vehicle.

5. The controller of claim 1, wherein the controller is instructions further include to transmit a message reporting the hydrocarbon emissions to a remote server separate from the second vehicle.

6. The controller of claim 1, wherein the instructions further include to cause a ventilation system to increase a recirculation setting based on the hydrocarbon emissions being elevated.

7. The controller of claim 1, wherein the instructions further include to transmit a message to a remote server in a third vehicle requesting that the third vehicle validate the hydrocarbon emissions.

8. A first vehicle comprising:
    a hydrocarbon sensor; and
    a controller in communication with the hydrocarbon sensor and programmed to
        receive data from the hydrocarbon sensor indicating hydrocarbon emissions before a change in position of the first vehicle relative to a second vehicle;
        receive data from the hydrocarbon sensor indicating hydrocarbon emissions after the change in position of the first vehicle relative to the second vehicle;
        determine that the hydrocarbon emissions originated in the second vehicle by determining that the detected hydrocarbon emissions changed from before to after the change in the position of the first vehicle relative to the second vehicle; and
        determine that the detected hydrocarbon emissions from the second vehicle are elevated.

9. The first vehicle of claim 8, further comprising an intake manifold, wherein the hydrocarbon sensor is mounted to the intake manifold.

10. The first vehicle of claim 8, further comprising a canister purge valve, a canister, and a canister purge line in fluid communication with the canister purge valve and the canister; wherein the hydrocarbon sensor is connected to the canister purge line.

11. The first vehicle of claim 10, wherein the programming to determine that the hydrocarbon emissions originated in the second vehicle includes programming to cause the canister purge valve to close and to receive data from the hydrocarbon sensor indicating hydrocarbon emissions after the canister purge valve closes.

12. The first vehicle of claim 8, wherein the controller is further programmed to cause the first vehicle to change a position relative to the second vehicle.

13. The first vehicle of claim 8, wherein the controller is further programmed to transmit a message reporting the hydrocarbon emissions to a remote server included in the second vehicle.

14. The first vehicle of claim 8, wherein the controller is further programmed to transmit a message reporting the hydrocarbon emissions to a remote server separate from the second vehicle.

15. The first vehicle of claim 8, further comprising a ventilation system in communication with the controller.

16. The first vehicle of claim 15, wherein the controller is further programmed to cause the ventilation system to increase a recirculation setting based on the hydrocarbon emissions being elevated.

17. The first vehicle of claim 8, wherein the controller is further programmed to transmit a message to a remote server in a third vehicle requesting that the third vehicle validate the hydrocarbon emissions.

18. A method comprising:
- detecting hydrocarbon emissions by a first vehicle before a change in position of the first vehicle relative to a second vehicle;
- detecting hydrocarbon emissions by the first vehicle after the change in position of the first vehicle relative to the second vehicle;
- determining that the hydrocarbon emissions originated in the second vehicle by determining that the detected hydrocarbon emissions changed from before to after the change in the position of the first vehicle relative to the second vehicle; and
- determining that the detected hydrocarbon emissions from the second vehicle exceed a predetermined threshold.

* * * * *